No. 697,265. Patented Apr. 8, 1902.
J. E. MILLS.
LATHE ATTACHMENT.
(Application filed June 17, 1901.)
(No Model.) 3 Sheets—Sheet 1.
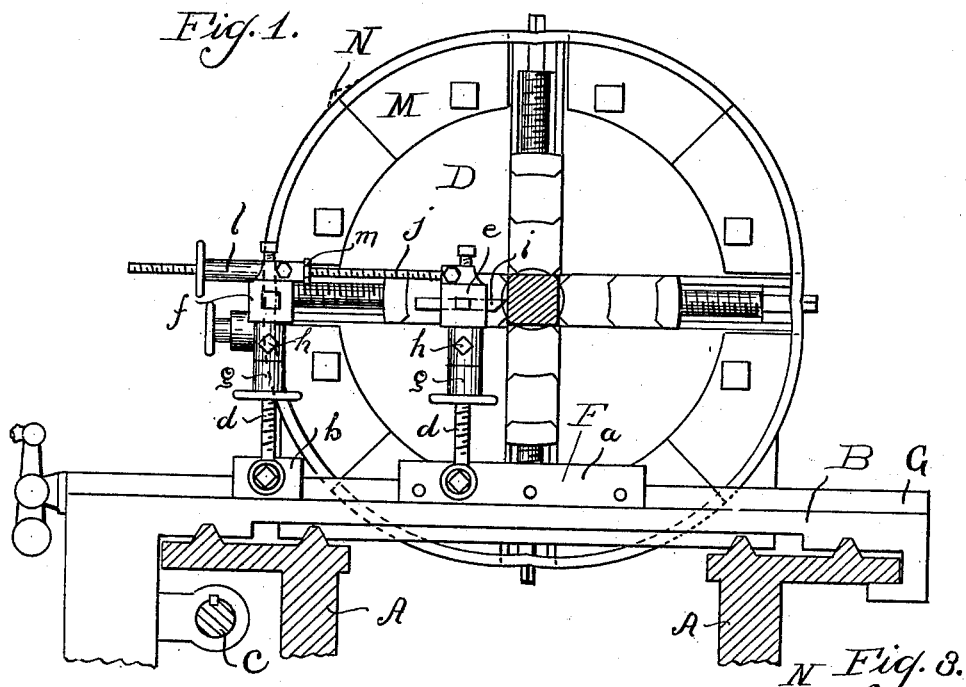
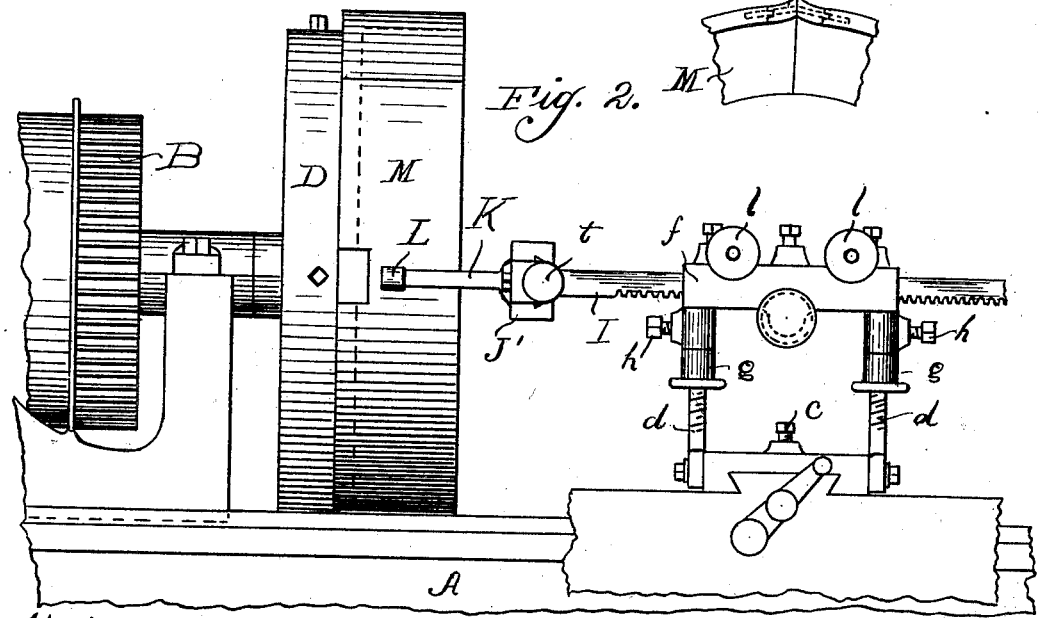
Witnesses:
E. F. Wilson
John Snowhook
Inventor:
John E. Mills
By Rudolph M. Loy
Attorney.

No. 697,265. Patented Apr. 8, 1902.
J. E. MILLS.
LATHE ATTACHMENT.
(Application filed June 17, 1901.)
(No Model.) 3 Sheets—Sheet 2.
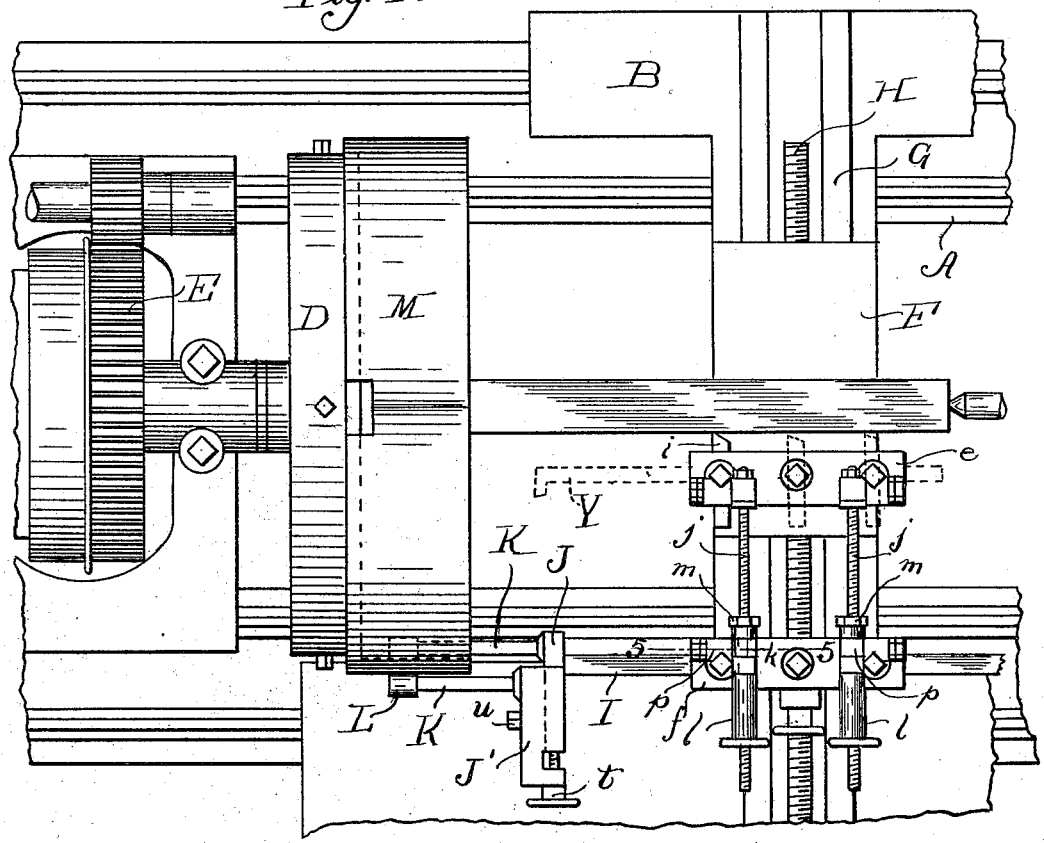
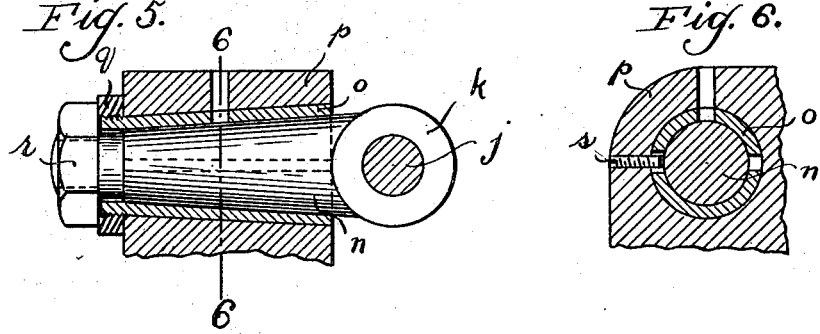

No. 697,265. Patented Apr. 8, 1902.
J. E. MILLS.
LATHE ATTACHMENT.
(Application filed June 17, 1901.)
(No Model.) 3 Sheets—Sheet 3.
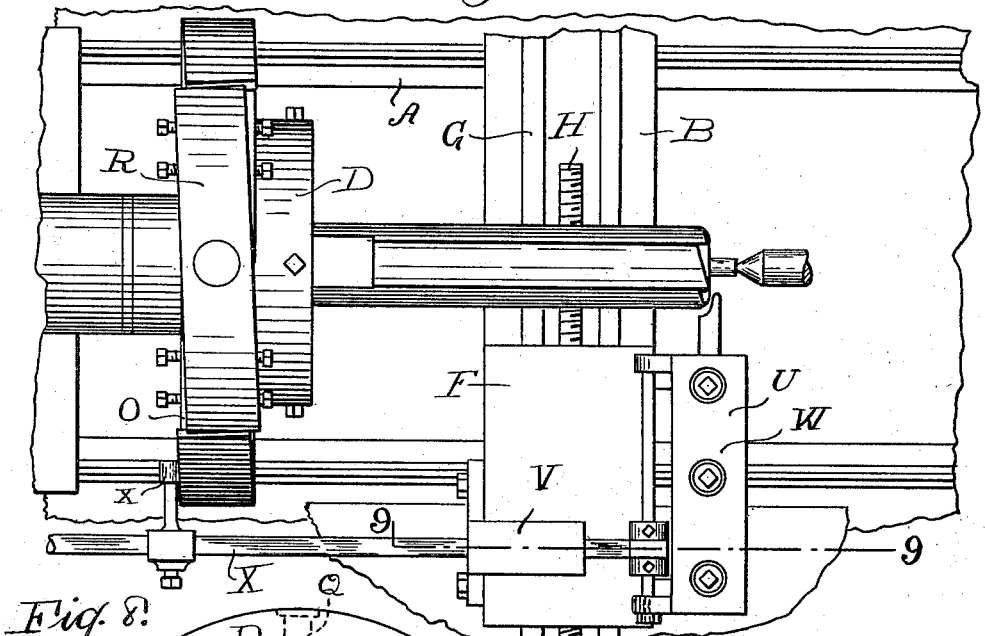
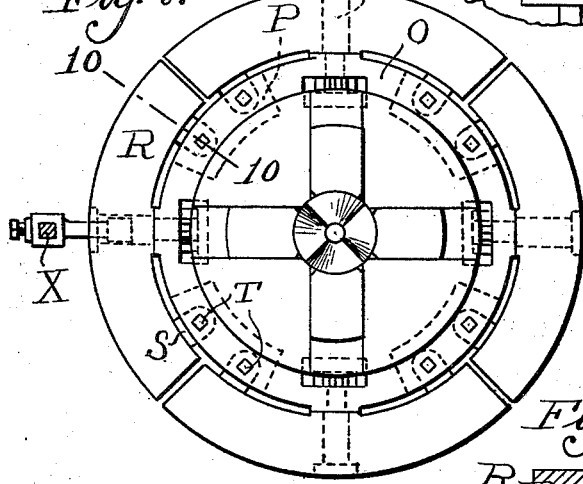
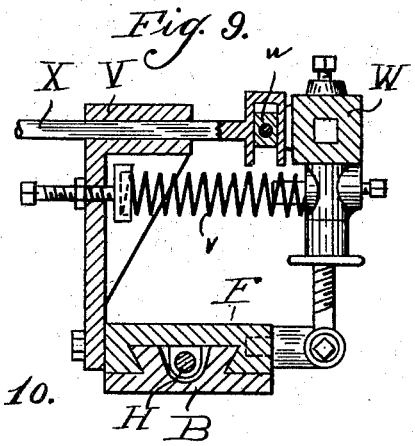
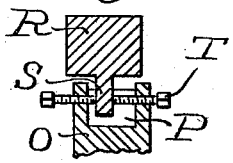
Witnesses:
E. F. Wilson
John Snowhook
Inventor:
John E. Mills
By Rudolph Wm. Lotz
Attorney.

UNITED STATES PATENT OFFICE.

JOHN E. MILLS, OF CHICAGO, ILLINOIS.

LATHE ATTACHMENT.

SPECIFICATION forming part of Letters Patent No. 697,265, dated April 8, 1902.

Application filed June 17, 1901. Serial No. 64,790. (No model.)

*To all whom it may concern:*

Be it known that I, JOHN E. MILLS, a citizen of the United States, residing at Chicago, in the county of Cook and State of Illinois, have invented certain new and useful Improvements in Lathe Attachments; and I do hereby declare the following to be a full, clear, and exact description of the invention, such as will enable others skilled in the art to which it appertains to make and use the same.

My invention relates to a novel construction in an attachment for lathes for turning and boring irregular shapes, the object being to provide a device of this character which is simple, durable, and efficient; and it consists in the features of construction and combinations of parts hereinafter fully described and claimed.

In the accompanying drawings, illustrating my invention, Figure 1 is a vertical transverse section through the lathe-bed, showing my attachment mounted on the carriage and on the chuck thereof. Fig. 2 is a side elevation of same. Fig. 3 is a detail fragmentary elevation showing a slight modification in the form of the cam for altering the shape turned by the cutting-tool. Fig. 4 is a top plan view of the devices shown in Figs. 1 and 2. Fig. 5 is a detail sectional view, on an enlarged scale, on the line 5 5 of Fig. 4. Fig. 6 is a section on the line 6 6 of Fig. 5. Fig. 7 is a top plan view of my device modified in construction to adapt it to turn irregular faces. Fig. 8 is a detail elevation of same looking toward the chuck of the lathe. Fig. 9 is a sectional view on the line 9 9 of Fig. 7. Fig. 10 is a detail sectional view on the line 10 10 of Fig. 8.

In turning irregular or polygonal shapes on a lathe it is necessary that the cutting-tool should move relatively to the piece being turned, the distances corresponding to the differences in radii of the shape to be turned. Thus, for instance, if it is desired to turn a piece to square cross-section the cutting-tool must have a reciprocal motion equal to one-half the difference in length between the diameter and diagonal of the square to be cut, and this movement must be graduated to correspond to the difference in length between the shortest radius and every radius intervening between the same and the longest radius. The same rule applies to boring and facing. I accomplish such movement of the cutting-tool by means of a cam mounted on the chuck of the lathe and connected with the tool-holder on the tool-carriage, the said cam having differential radii corresponding exactly with radii of the shape to be cut. The said cams are produced by a reciprocal motion of the tool received from a piece inserted in the chuck and having the shape and size desired to be reproduced.

In said drawings, A is the lathe-bed; B, the tool-carriage, which receive its motion from a shaft C, and D is the chuck, receiving motion from the driving-gear E. The tool-holder F is movably mounted in guides G on said tool-carriage B and is moved by means of the hand-screw H and secured in any desired position on said carriage B by means of a set-screw. The said tool-holder consists of two parts or base-pieces *a* and *b*, the latter of which is not connected with said hand-screw H, but is set to the desired position and locked by means of the set-screw *c*. Each of said base-pieces *a* and *b* carries a pair of pivotal screw-threaded arms *d*, carrying longitudinally-movable heads *e* and *f* at their upper ends. The positions of the latter are adjusted by means of hand-screws *g* on said arms *d* and are locked in any desired position by means of set-screws *h*. Said head *e* is adapted to receive the cutting tool or tools *i* and is connected with the head *f* by means of screw-threaded arms *j*, pivotally secured at one end to said head *e* and passing through sleeves *k*, pivotally mounted on head *f*. Screw-threaded hand-wheels *l* and lock-nuts *m* serve to determine the positions of the sleeves *k* on the free end portions of said arms *j*. Said sleeves *k* carry shanks *n*, journaled in split sleeves *o*, mounted in openings in projections *p* on head *f*, said projections *p* having conical openings to receive said sleeves and the latter being also conical and of greater length than said projections *p*, the smaller end being externally threaded and receiving a nut *q*, by means of which said sleeves *o* are drawn into and held in place in said projections *p*. The shanks *n* of sleeves *k* are also tapered to fit sleeves *o* and are of greater length than the latter, the smaller end being turned cylindrical and threaded to receive a nut $r$. Said sleeve $o$ is held against rotation by means of set-screw $s$ in an obvious manner. Said head $f$ is provided with a longitudinal opening to receive a rack-bar I, extending parallel with the bed of the lathe. The said rack-bar I carries a head J, at one end of which is mounted a head J', adjusted in position by means of thumb-screw $t$ and locked in position by means of set-screw $u$. The heads J and J' each carry a rigid arm K, provided with an antifriction-roller L, engaging opposite faces of a drum-cam M, mounted on the chuck and imparting the desired reciprocal motion to the tool-head $e$ in an obvious manner. Said head $f$ carries a gear-pinion meshing with said rack-bar I and serving to move same relatively to said head $f$ as the latter approaches said cam M. The latter is mounted on the chuck in any desired manner and is so formed as to impart the desired reciprocal motion to the cutting-tool. The said rack-bar moves with the tool-carriage and is moved relatively to the same at intervals by the operator to prevent the ends of the arms K from striking the end wall or head of the cam M. The cam M when shaped as shown in full lines in Fig. 1 will so move the cutting-tool as to cut a bar practically square in cross-section, but having round corners. When it is desired to cut square corners, said cam must be extended peripherally, as shown in dotted lines at N, Fig. 1. This may be accomplished by inserting a piece N of the desired form in the manner shown in Fig. 3.

In Figs. 7 to 10, inclusive, I have shown my device adapted for cutting irregular faces on the ends of bars or rods to produce socket-boring tools, &c. To this end I mount on the chuck, preferably on the rear face thereof, an auxiliary disk or face-plate O, provided with a plurality of peripheral recesses P and with openings adapted to receive pins Q, by means of which a plurality of segmental heads R are pivotally mounted on said disk O. Each of said heads R carries lugs S, entering recesses P, and are engaged therein by the ends of set-screws T, Fig. 10, by means of which said heads R are set at an angle to the plane of said disk. Mounted on the tool-carriage is a tool-holder U, having a rigid member V and a pivoted tool-head W, between which a compression-spring $v$ is interposed, which serves to normally hold said tool-head W at the rearward limit of its motion. Said tool-head W carries a pivoted block $w$, adapted to enter a recess in the head of a rod X, longitudinally movable in the rigid member V of the tool-holder and carrying an antifriction-roller $x$ at its other end, which engages the rear faces of the heads R to draw the tool-head W toward the end of the bar or rod to be faced against the action of said spring $v$.

In dotted lines, Fig. 4, I have shown a boring-tool Y, which is substituted for the cutting-tools when it is desired to bore an irregularly-shaped hole.

My device is very simple and efficient and makes the operation of cutting irregular shapes very cheap as compared with the usual method of operation.

I claim as my invention—

1. In a lathe, the combination with a chuck and a tool-carriage, of a cam mounted on said chuck, a pivotally-movable tool-head transversely adjustably mounted on the tool-carriage, and devices on said tool-head engaging said cam to impart reciprocal movement to the cutting-tool, substantially as described.

2. In a lathe, the combination with the chuck and the tool-carriage, of a tool-holder mounted on the tool-carriage, said tool-holder comprising two heads pivotally and relatively movable, means for adjusting same in relative position, and devices for imparting pivotal movement to said heads comprising a drum-cam mounted on the chuck, a rack-bar passing through one of said heads and movable relatively thereto, and relatively-adjustable arms at one end of said rack-bar engaging opposite peripheral faces of said cam.

In testimony whereof I affix my signature in presence of two witnesses.

JOHN E. MILLS.

Witnesses:
P. MALLAND,
MARTIN MILLS.